United States Patent [19]

Kokubu et al.

[11] 4,404,312
[45] Sep. 13, 1983

[54] FIBER-REINFORCED POLYMER BLEND COMPOSITION

[75] Inventors: Tokio Kokubu; Katsuo Take, both of Otsu, Japan

[73] Assignee: Toyo Boseki Kabushiki Kaisha, Osaka, Japan

[21] Appl. No.: 369,671

[22] Filed: Apr. 19, 1982

[30] Foreign Application Priority Data

Apr. 17, 1981 [JP]  Japan ................................. 56-58849
Jul. 24, 1981 [JP]  Japan ............................... 56-116876
Jul. 30, 1981 [JP]  Japan ............................... 56-119615

[51] Int. Cl.$^3$ ...................... C08L 23/14; C08L 77/00
[52] U.S. Cl. .................................. 524/504; 524/505; 524/514
[58] Field of Search .................. 524/504, 514; 525/66, 525/183

[56] References Cited

U.S. PATENT DOCUMENTS 4,080,349  3/1978  Wurmb et al. ...................... 524/504
4,105,709  8/1978  Iwami et al. ........................ 524/514
4,339,555  7/1982  Chmura et al. ....................... 525/66
4,346,194  8/1982  Roura .................................. 525/66

FOREIGN PATENT DOCUMENTS 53-120761  10/1978  Japan ................................. 524/514
56-28241   3/1981   Japan ................................. 524/514
2052528    1/1981   United Kingdom ................ 524/514

Primary Examiner—Lewis T. Jacobs
Attorney, Agent, or Firm—Jones, Tullar & Cooper

[57] ABSTRACT

A fiber-reinforced polymer blend composition comprising (a) a polyamide resin, (b) a modified polypropylene resin having a melt flow index of 1 to 50 g/10 minutes and at least one carboxyl group in the molecule and (c) a fiber-reinforcing agent, the weight ratio of the polyamide resin (a) and the polypropylene resin (b) being from 70:30 to 95:5 and a content of the fiber-reinforcing agent (c) being from 50 to 200% by weight on the basis of the total amount of the polyamide resin (a) and the polyprolylene resin (b), which is excellent in heat resistance, water resistance, impact resistance and surface resistance.

12 Claims, No Drawings

FIBER-REINFORCED POLYMER BLEND COMPOSITION

The present invention relates to a fiber-reinforced polymer blend composition. More particularly, it relates to a polyamide resin/modified polypropylene resin blend composition reinforced with fibers having excellent heat resistance, water resistance, impact resistance, surface characteristics, etc.

Hitherto, it is well known to improve the physical properties of polyamide resins such as rigidity, elongation and water resistance by incorporating therein a salt of a copolymer of an olefin and an ethylenically unsaturated carboxylic acid, a mixture of polyethylene and a graft copolymer of ethylene and maleic anhydride, etc. (U.S. Pat. No. 3,845,163; U.S. Pat. No. 3,963,799). However, these blend compositions are defective in losing good heat resistance inherent in the polyamide resins. In addition, such blend compositions are easily deformed and inferior in dimensional stability. It is also known that the incorporation of a polypropylene resin is effective in protecting of a polyamide resin from deterioration of physical properties and change of dimension due to the absorption of water, without depression of the mechanical strength and the heat resistance. However, a polyamide resin and a polypropylene resin are inferior in compatibility so that the resulting blend composition is low in bending strength. Further, the shaped article manufactured with such composition has poor surface characteristics. In addition, the incorporation of a polypropylene resin tends to cause the breaking during the manufacture of pellets by the use of an extruder. This is a great problem in an industrial operation.

The compatibility between a polyamide resin and a polypropylene resin can be improved by using a carboxyl group-modified polypropylene resin as the polypropylene resin. The resulting blend composition is, however, inferior to a blend composition of a polyamide resin with an unmodified polypropylene resin in impact resistance (Kobunshi Kagaku (i.e. Polymer Chemistry), 30, 644 (1973); Japanese Patent Publication (unexamined) No. 28241/81).

As a result of the extensive study seeking a polymer blend composition improved in impact resistance while keeping excellent mechanical properties inherent in polyamide resins without causing any unfavorable influence on the surface characteristics, it has now been found that a composition comprising a polyamide resin, a certain modified polypropylene resin and a fiber-reinforcing agent in a certain specific proportion meets such requirements.

A main object of the present invention is to provide a polymer blend composition excellent in rigidity, heat resistance, water resistance and impact resistance. Another object of this invention is to provide a polymer blend composition with excellent molding properties, which can provide a molded product having high dimensional stability without any unfavorable warp or deformation. A further object of the invention is to provide a polymer blend composition having excellent surface characteristics. A still further object of the invention is to provide a fiber-reinforced plastic molded product having an improved percentage retention of strength when exposed to water absorption, dimensional stability and chemical resistance while maintaining the fundamental advantageous characteristics inherent in polyamide resins.

Since polyamide resins are of light weight and have excellent impact resistance, heat resistance, chemical resistance, etc., they are used for manufacture of various shaped articles such as vessels and containers. Attempts have been made to manufacture various vessels of containers, for which water resistance, heat resistance, chemical resistance, etc. are required, with polyamide resins. For instance, the manufacture of radiator tanks and water pump housings with polyamide resins, particularly glass fiber-reinforced polyamide resins, has been attempted. However, the absorption of water by polyamide resins causes various problems such as variation of dimensions and depression in strength. Further, considerable resistance to zinc chloride is frequently required for vessels or containers. In the case of a radiator tank, for instance, the core portion corresponding to a heat exchanger is usually made of a metal such as brass or zinc plated steel. The reaction between such metal and chlorine contained in tap water produces zinc chloride. Such zinc chloride causes stress cracking in polyamide resins depending upon the stress conditions. Therefore, polyamide resins should have sufficient resistance to stress cracking for the purpose of manufacture of vessels of containers. These requirements can be also met by the composition of the invention.

According to the present invention, there is provided a fiber-reinforced polymer blend composition comprising (a) a polyamide resin, (b) a modified polypropylene resin having a melt flow index (MFI) of 1 to 50 g/10 minutes and at least one carboxyl group in the molecule and (c) a fiber-reinforcing agent, the weight ratio of the polyamide resin (a) and the modified polypropylene resin (b) being from 70:30 to 95:5 and the content of the fiber-reinforcing agent (c) being from 50 to 200% by weight on the basis of the total amount of the polyamide resin (a) and the modified polypropylene resin (b).

The blend composition of the invention is characterized in comprising the modified polypropylene resin (b) having a certain specific MFI value and the fiber-reinforcing agent (c) in a great amount. For attaining these characteristics, there is used the modified polypropylene resin (b) of which the molecular weight is suppressed as low as possible on modification and which is appropriately grafted. Quite different from the past knowledge, the polymer blend composition of the invention incorporating such modified polypropylene resin (b) shows excellent impact resistance nearly comparable to that of glass fiber-reinforced polyamide resins with or without an unmodified polypropylene resin additive.

As the polyamide resin (a), there may be used any one chosen from polyamides prepared from aliphatic, alicyclic and aromatic amines (e.g. hexamethylene diamine, decamethylene diamine, dodecamethylene diamine, 2,2,4- or 2,4,4-trimethylhexamethylene diamine, 1,3- or 1,4-bis(aminomethyl)cyclohexane, bis(p-aminocyclohexylmethane), m- or p-xylene diamine) and aliphatic, alicyclic and aromatic dicarboxylic acids (e.g. adipic acid, suberic acid, sebacic acid, cyclohexanedicarboxylic acid, terephthalic acid, isophthalic acid), polyamides prepared from aminocarboxylic acids (e.g. 6-aminocaproic acid, 11-aminoundecanoic acid, 12-aminododecanoic acid), polyamides prepared from lactams (e.g. ε-caprolactam, ω-dodecalactam), polyamides prepared from two or more of the above components, etc. A mixture of two or more of the above polyamides is also usable. Specific examples of the usable polyamide resin are polycapramide (Nylon 6), polydodecanamide (Nylon 12), polyhexamethylene adipamide (Nylon 66), polyhexamethylene azelamide (Nylon 69), polyhexamethylene sebacamide (Nylon 610), polyhexamethylene dodecanamide (Nylon 612), polyxylylene adipamide, polyhexamethylene terephthalamide, polyphenylene phthalamide, Nylon 6/66, poly(xylylene adipamide/hexamethylene adipamide), etc.

Among various polyamides, those having a melting point of 200° C. or higher are preferred. While the molecular weight is not critical, those polyamides having a relative viscosity of not less than 1.8 (measured in 98% sulfuric acid according to JIS (Japanese Industrial Standards) K 6810-70), particularly of not less than 2.0, are preferred. The polyamides may comprise a branching agent in the polymerized portion in such an amount that the molding properties are not deteriorated. In general, polyamides comprising capramide as the repeating units or polycapramide as the major component can provide a good result. A blend of polyamides having different viscosities may be also used.

As the modified polypropylene resin (b), there may be used one having an MFI value of 1 to 50 g/10 min when determined according to ASTM D-1238-62T (230° C.; load, 2.16 kg) and comprising a carboxyl group. Preferred is one having an MFI value of 1 to 20 g/10 min. When the MFI value is too small, the molding property is poor. When the MFI value is too large, the physical properties of the molded product are lowered. The introduction of a carboxyl group can be accomplished, for instance, by copolymerizing propylene with an ethylenically unsaturated carboxylic acid or its derivative in a weight proportion of 100:0.02–5, preferably of 100:0.1–0.5. Where the amount of the ethylenically unsaturated carboxylic acid or its derivative being too small, the modification effect is insufficient. Where the amount is too large, change of color, deterioration of physical properties, etc. are caused. Although the copolymerization may be carried out during the polymerization of propylene, it is rather usual to graft polymerize an ethylenically unsaturated carboxylic acid or its derivative onto a polypropylene resin.

The graft polymerization may be carried out, for instance, by melt kneading a polypropylene resin and an ethylenically unsaturated carboxylic acid or its derivative with an organic peroxide in an amount of not more than 0.1 part by weight, preferably not more than 0.03 part by weight, more preferably not more than 0.01 part by weight, to 100 parts by weight of the polypropylene resin. When the amount of the organic peroxide is too large, the molecular weight of the polypropylene resin is lowered and the MFI value is increased, whereby the physical properties of the molded product are deteriorated. The amount of the organic peroxide may be very small and is usually not less than 0.002 part by weight to 100 parts by weight of the polypropylene resin. As the polypropylene resin to be used for the graft polymerization, an isotactic one is preferred. Not only polypropylene itself but also a random or block copolymer of propylene with one or more olefins wherein the content of propylene is not less than 80 mol% is usable. The polypropylene resin usually has an MFI value of 0.4 to 30 g/10 min, preferably of 1 to 10 g/10 min, particularly preferably of 1 to 5 g/10 min. Examples of the ethylenically unsaturated carboxylic acid or its derivative are acrylic acid, methacrylic acid, itaconic acid, maleic acid, fumaric acid, monomethyl maleate, monoethyl maleate, maleic anhydride, fumaric anhydride, etc. Thus, the derivative includes monoesters, anhydrides, etc. Maleic anhydride is the most preferred. As the organic peroxide, there may be exemplified dicumyl peroxide, benzoyl peroxide, lauroyl peroxide, etc. Among them, dicumyl peroxide is the most preferred. The conditions of melt kneading depend upon the kneading apparatus, the kind of the starting resin, etc. The temperature may be usually from the melting point of the polypropylene resin to 280° C., preferably from 180° to 270° C. The time may be relatively short and is usually from 30 seconds to 5 minutes. As the kneading apparatus, the use of an extruder is favorable from the viewpoint of the uniformity of the resultant product.

The weight proportion of the polyamide resin (a) and the modified polypropylene resin (b) may be from 70:30 to 95:5, preferably from 75:25 to 95:5, more preferably from 80:20 to 90:10. When the amount of the modified polypropylene resin is less than the said lower limit, the water resistance is deteriorated and thermal fluidity is lowered. Thus, the molding properties are adversely affected. When the amount is more than the said upper limit, the heat resistance is lost.

The fiber-reinforcing agent (c) may be, for instance, glass fibers, metal coated glass fibers, ceramic fibers, carbon fibers, metal carbide fibers, metal boride fibers, silicon carbide fibers, whiskers, alamide fibers and curable phenolic resin fibers. Among them, glass fibers are the most preferable. The fiber-reinforcing agent may be previously treated with any coupling agent. Particularly when the fiber-reinforcing agent is glass fibers, it is preferred to be pre-treated with aminosilane, epoxysilane or the like.

The amount of the fiber-reinforcing agent may be usually from 50 to 200 parts by weight, preferably from 60 to 150 parts by weight, to 100 parts by weight of the combined amount of the polyamide resin (a) and the modified polypropylene resin (b), although it may be varied with the kind of the fiber-reinforcing agent, the physical property as intended, etc. When the amount of reinforcing agent is too large, breaking of of strands are frequently produced in the manufacture of pellets by extrusion of the blend composition. Further, the improvement of the physical properties can not be expected. Moreover, the melt fluidity is remarkably deteriorated, and molding becomes difficult. When the amount of reinforcing agent is too small, rigidity is lost. For injection molding, the amount of reinforcing agent is preferred to be not more than 150 parts by weight from the viewpoint of molding properties.

In this invention, blending with a suitable amount of the modified polypropylene resin (b) makes it possible to incorporate a large amount of the fiber-reinforcing agent (c) to provide a polymer blend composition having a good molding properties. The molded product of such blend composition has excellent physical properties without warp and deformation. Further, it is markedly improved in dimensional stability and mechanical strength upon water absorption. Moreover, it has improved impact resistance.

The blend composition of this invention may also contain various additives such as inorganic fillers (e.g. talc, mica, metal, glass), reinforcing agents, flame retardants, antistatic agents, heat stabilizers, antioxidants, light stabilizers, stabilizers for prevention of deterioration due to copper, dyestuffs, pigments, antislipping agents, releasing agents, nucleating agents and foaming agents. Also, any other thermoplastic resin having a relatively high melting point may be incorporated therein insofar as such incorporation does not produce any adverse effect. Further, a portion of the modified polypropylene resin (b) may be replaced by any unmodified polypropylene resin.

The blend composition of the invention can be molded by any conventional procedure such as injection molding, extrusion molding or press molding. The resultant molded product has excellent surface characteristics, rigidity, heat resistance, water resistance, dimensional stability, impact resistance, deformation resistance, etc.

A vessel or container manufactured by molding of the blend composition of the invention has a small equilibrium water absorption and does not display any change in dimension and strength due to water absorption even when placed in water or boiling water or under high humid conditions. Further, it is characterized in having great resistance to zinc chloride or calcium chloride. It is also characterized in showing high heat resistance, good molding properties at low temperatures, excellent cold resistance, etc. Examples of the vessel or container are radiator tanks, heater cores, water pump housings, etc. These may be partly made of the blend composition of the invention and partly made of any other material such as zinc plated steel, stainless steel or aluminum. They include any opened or closed article wherein a liquid, a gas or a solid is temporarily or permanently stored or accommodated.

This invention will be explained more in detail by the following Examples wherein % and part(s) are by weight. The physical values represent those measured by JIS K 6810-70.

EXAMPLE 1

As the polyamide resin (hereinafter referred to as "PA resins"), Nylon 6 having a relative viscosity of 2.2 was used in Sample Nos. 1 to 11, and Nylon 6 having a relative viscosity of 3.1 was used in Sample No. 12. As the polypropylene resin (hereinafter referred to as "PP resin"), a modified polypropylene resin obtained by grafting maleic anhydride onto isotactic polypropylene resin having an MFI value of 3.0 (230° C., 2.16 kg) according to the procedure as hereinafter described was used in Sample Nos. 1 to 3, 5, 6 and 10, a modified polypropylene resin obtained by grafting maleic anhydride onto isotactic polypropylene resin having an MFI value of 2.0 according to the procedure as hereinafter described was used in Sample Nos. 7 and 8, and a modified polypropylene resin obtained by grafting maleic anhydride onto isotactic polypropylene resin having an MFI value of 3.0 according to the procedure as hereinafter described was used in Sample No. 4. As the glass fibers, chopped strands of 3 mm treated with aminosilane were used.

The modified polypropylene resin was manufactured by applying a solution of designed amounts of maleic anhydride and dicumyl peroxide as shown in Table 1 in acetone (5.3 parts) onto the surfaces of the pellets of polypropylene (100 parts), melt kneading the resultant pellets at 240° C. for about 1 minute by the aid of a twin screw extruder of 30 mm $\phi$ and then pelletizing.

Dried PA resin, modified PP resin and glass fibers were mixed together in a proportion as shown in Table 1. The resultant mixture was melt kneaded at 280° C. by the use of a twin screw extruder of 30 mm $\phi$ and pelletized. After drying at 90° C. under reduced pressure for 24 hours, the pellets were supplied to the hopper of a screw-in-line type injection molding machine at temperatures of 260° C.-280° C.-280° C. and molded at a mold temperature of 80° C. to make test pieces according to JIS K 6810-70.

The injection pressure was so chosen as could charge the polymer blend sufficiently within the cavity of the mold. The fluidity of the polymer blend in Table 1 was classified into the following three groups: A, injection pressure of less than 600 kg/cm$^2$ (good fluidity); B, injection pressure of 600 to 900 kg/cm$^2$ (somewhat poor fluidity); C, injection pressure of more than 900 kg/cm$^2$ (poor fluidity).

For measurement of water absorption and the bending modulus and the strength upon water absorption, bending test pieces dipped in boiling water (100° C.) for 3 days were used.

The results are shown in Table 1 wherein Sample Nos. 2, 3, 5 to 8 and 10 are within the scope of this invention (Example), and Sample Nos. 1, 4, 9, 11 and 12 are for comparison (Comparative Example).

TABLE 1

| | | Comparative | Example | Comparative | Example | | | | Comparative | Example | Comparative | |
|---|---|---|---|---|---|---|---|---|---|---|---|---|
| Sample No. | | 1 | 2 | 3 | 4 | 5 | 6 | 7 | 8 | 9 | 10 | 11 | 12 |
| Composition | PA resin/(PA resin + PP resin) (%) | 80 | 80 | 80 | 80 | 80 | 80 | 80 | 80 | 100 | 80 | 100 | 100 |
| | PP resin/(PA resin + PP resin) (%) | 20 | 20 | 20 | 20 | 20 | 20 | 20 | 20 | 0 | 20 | 0 | 0 |
| PP Resin | MFI of modified PP resin (g/10 min) | 67 | 27 | 18 | 3 | 13 | 6 | 5 | 4 | — | 8 | — | — |
| | Maleic anhydride (part)*(1) | 0.2 | 0.2 | 0.2 | — | 0.4 | 0.05 | 0.4 | 0.4 | — | 0.4 | — | — |
| | Dicumyl peroxide (part)*(1) | 0.1 | 0.03 | 0.009 | — | 0.005 | 0.002 | 0.005 | 0.002 | — | 0.005 | — | — |
| | Glass fibers (part)*(2) | 100 | 100 | 100 | 100 | 100 | 100 | 100 | 100 | 100 | 67 | 67 | 43 |
| Fluidity of composition | | A | A | A | A | A | A | A | A | B | A | B | A |
| Physical property of molded product | Heat deformation temperature (°C.) | 203 | 202 | 203 | 202 | 205 | 201 | 204 | 204 | 205 | 202 | 202 | 201 |
| | Flexural modulus (Kg/mm$^2$) | 1043 | 1047 | 1146 | 1031 | 1084 | 1056 | 1109 | 1057 | 1106 | 871 | 903 | 756 |
| | Flexural strength (kg/mm$^2$) | 19.4 | 21.9 | 24.2 | 19.2 | 24.4 | 21.0 | 23.6 | 23.1 | 26.9 | 20.4 | 22.6 | 21.3 |
| | Notched izod impact strength (kg.cm/cm) | 11 | 13 | 17 | 15 | 17 | 14 | 17 | 15 | 15 | 13 | 14 | 12 |
| | Water absorption (%) | 3.2 | 3.2 | 3.2 | 3.2 | 3.2 | 3.2 | 3.2 | 3.2 | 4.2 | 3.9 | 5.2 | 6.1 |
| | % Retention of flexural modulus after water absorption (%) | 53 | 57 | 57 | 53 | 54 | 56 | 56 | 56 | 40 | 56 | 40 | 37 |
| | % Retention of flexural strength | 52 | 57 | 55 | 53 | 55 | 56 | 55 | 55 | 44 | 57 | 43 | 41 |

TABLE 1-continued

| | Example/Comparative | | | | | | | | | | | |
|---|---|---|---|---|---|---|---|---|---|---|---|---|
| | Comparative | Example | Comparative | Example | | | | Comparative | Example | Comparative | |
| Sample No. | 1 | 2 | 3 | 4 | 5 | 6 | 7 | 8 | 9 | 10 | 11 | 12 |
| after water absorption (%) | | | | | | | | | | | | |

Note:
*[1] Proportion to 100 parts of PP resin on modification.
*[2] Proportion to 100 parts of PA resin and PP resin in total.

From the above results, it is seen that when PP resin is modified by the use of a great amount of dicumyl peroxide, the molecular weight is lowered, as understood from the increase of the MFI value in Sample No. 1. Thus, the physical properties of the molded product are lowered, and the izod impact strength (notched) is remarkably deteriorated in comparison with that of the glass fiber-reinforced polyamide resin (Sample No. 9) and that of the polymer blend composition using unmodified PP resin (Sample No. 4), To the contrary, modified PP resin prepared by the use of dicumyl peroxide in an amount of less than 0.01 part shows an MFI value of less than 20 g/10 minutes, and the polymer blend composition prepared therewith gives an excellent value nearly equal to or more than the glass fiber-reinforced polyamide resin in izod impact strength (notched). This is probably due to the very good balance between the pertinent compatibility of modified PP resin with PA resin and the chemical and mechanical adhesion in the matrix of glass fibers. The polymer blend composition with unmodified PP resin (Sample No. 4) is relatively high in izod impact strength (notched) but poor in breaking strength at bending modulus and surface characteristics. Further, as shown in Sample No. 6, impact resistance is lowered when maleic acid as the modifying agent is used in a small amount. Irrespective of being modified or unmodified, the incorporation of PP resin gives a high % retention of flexural modulus after water absorption.

Thus, the fiber-reinforced polymer blend composition of the invention incorporated with PP resin as modified under certain specific conditions is characterized in showing excellent molding property, impact resistance, water resistance and surface characteristics.

EXAMPLE 2

Using fiber-reinforced polymer blend compositions comprising Nylon 6 having a relative viscosity of 2.2 as PA resin and a modified polypropylene resin prepared by modifying isotactic polypropylene having an MFI value of 3.0 with maleic anhydride in the same manner as in Example 1 as PP resin in various proportions, there were molded test pieces, which were subjected to evaluation of physical properties. The results are shown in Table 2.

TABLE 2

| | | Example/Comparative | | | | |
|---|---|---|---|---|---|---|
| | | Comparative | Example | | | |
| Sample No. | | 13 | 14 | 15 | 16 | 17 |
| Composition | PA resin/(PA resin + PP resin) (%) | 97 | 94 | 90 | 80 | 70 |
| | PP resin PP resin/(PA resin + PP resin) (%) | 3 | 6 | 10 | 20 | 30 |
| | MFI of modified PP resin (g/10 min) | 18 | 18 | 18 | 18 | 18 |
| | Maleic anhydride (part)*[1] | 0.2 | 0.2 | 0.2 | 0.2 | 0.2 |
| | Dicumyl peroxide (part)*[1] | 0.009 | 0.009 | 0.009 | 0.009 | 0.009 |
| | Glass fibers (part)*[2] | 100 | 100 | 100 | 100 | 100 |
| Fluidity of composition | | B | A | A | A | A |
| Physical property of molded product | Heat deformation temperature (°C.) | 205 | 204 | 204 | 203 | 177 |
| | Flexural modulus (kg/mm$^2$) | 1087 | 1113 | 1125 | 1146 | 988 |
| | Flexural strength (kg/mm$^2$) | 25.7 | 25.8 | 25.1 | 24.2 | 20.7 |
| | Notched izod impact strength (kg.cm/cm) | 15 | 15 | 16 | 17 | 15 |
| | Water absorption (%) | 4.0 | 3.8 | 3.6 | 3.2 | 2.8 |
| | % Retention of flexural modulus after water absorption (%) | 43 | 50 | 53 | 57 | 65 |
| | % Retention of flexural strength after water absorption (%) | 42 | 50 | 53 | 55 | 60 |

Note:
*[1] Proportion to 100 parts of PP resin on modification.
*[2] Proportion to 100 parts of PA resin and PP resin in total.

From the above results, it is seen that a molded product having excellent impact strength, water resistance and surface characteristics can be obtained from the fiber-reinforced polymer blend composition of the invention. When the amount of modified PP resin is too great, the high heat distortion temperature inherent to PA resin is lowered. When too small, the characteristics at the water absorption are deteriorated.

EXAMPLE 3

As PA resin, Nylon 6 having a relative viscosity of 2.2 was used. As modified PP resin, the one prepared by grafting isotactic polypropylene having an MFI value of 3.0 with maleic anhydride in the proportion as shown in Table 3 in the same manner as in Example 1 was used in Sample No. 30, and unmodified PP resin of the same grade as above was used in Sample No. 29. As the glass fibers, chopped strands of 3 mm long treated with aminosilane were used.

Dried PA resin, PP resin and glass fibers were mixed together in a proportion as shown in Table 3. The resulting mixture was melt kneaded at 280° C. by the use of a twin screw extruder of 30 mm φ and pelletized. The resultant pellets were dried at 90° C. under reduced pressure for 24 hours and molded as in Example 1 to give test pieces.

For measurement of the water absorption and the flexural modulus and the flexural strength after water absorption, flexural test pieces dipped in boiling water at 100° C. for 3 days were used. The dimensional stability after water absorption was determined by shaping the polymer blend composition into a flat plate (100×100×2, film gate), measuring the size at the dryness immediately after the shaping and the size after dipping in hot water of 50° C. for 1000 hours and then making the calculation according to the following equation: size % dimensional change after water absorption=(size after water absorption/size after shaping - 1)×100.

Stress cracking resistance was evaluated according to the following method: a load was charged with a loading rate of 2 mm/min to the center of a test piece having a section of about 3 mm in thickness and about 6.4 mm in width with a test length of 50 mm under the state of free support at both edges to reach a designed initial load; at the central portion of the reverse side of the test piece kept under this state (i.e. the state relaxed from stress) and corresponding to the loading point, a saturated solution of zinc chloride was attached quickly; in case of the load being great, stress cracking was produced after the lapse of a certain time to break.

The relationship between the initial load and the time from the charge of a designed initial load to the change to ½ stress (endurance time) was traced. A higher initial load with an endurance time exceeding 30 minutes was evaluated as better stress cracking resistance: i.e. A, initial load with an endurance time exceeding 30 minutes corresponding to a stress of more than 18 kg/mm²; B, initial load with an endurance time exceeding 30 minutes corresponding to a stress of 14 to 18 kg/mm²; C, initial load with an endurance time exceeding 30 minutes corresponding to a stress of less than 14 kg/mm².

The results are shown in Table 3 wherein Sample Nos. 20 to 23, 27, 28 and 30 are within the scope of the invention (Example) and Sample Nos. 18, 19, 24 to 26 and 29 are for comparison (Comparative Example).

TABLE 3

| | | Example/Comparative | | | | | | | | | | | |
|---|---|---|---|---|---|---|---|---|---|---|---|---|---|
| | | Comparative | | Example | | | | Comparative | | | Example | | Comparative | Example |
| Sample No. | | 18 | 19 | 20 | 21 | 22 | 23 | 24 | 25 | 26 | 27 | 28 | 29 | 30 |
| Composition | PA resin/(PA resin + PP resin) (%) | 100 | 97 | 94 | 90 | 80 | 70 | 60 | 80 | 80 | 80 | 80 | 80 | 80 |
| PP resin | PP resin/(PA resin + PP resin) (%) | 0 | 3 | 6 | 10 | 20 | 30 | 40 | 20 | 20 | 20 | 20 | 20 | 20 |
| | MFI of modified PP resin (g/10 min) | — | 18 | 18 | 18 | 18 | 18 | 18 | 8 | 8 | 8 | 8 | 3 | 27 |
| | Maleic anhydride (part)*(1) | — | 0.2 | 0.2 | 0.2 | 0.2 | 0.2 | 0.4 | 0.4 | 0.4 | 0.4 | — | 0.2 | |
| | Dicumyl peroxide (part)*(1) | — | 0.009 | 0.009 | 0.009 | 0.009 | 0.009 | 0.009 | 0.005 | 0.005 | 0.005 | 0.005 | — | 0.03 |
| | Glass fibers (part)*(2) | 100 | 100 | 100 | 100 | 100 | 100 | 100 | 30 | 43 | 67 | 130 | 100 | 100 |
| Physical property of molded product | Heat deformation temperature (°C.) | 205 | 203 | 204 | 204 | 203 | 177 | 159 | 168 | 188 | 202 | 205 | 202 | 202 |
| | Flexural modulus (kg/mm²) | 1106 | 1087 | 1113 | 1125 | 1146 | 988 | 824 | 560 | 710 | 871 | 1188 | 1031 | 1047 |
| | Flexural strength (kg/mm²) | 26.9 | 25.7 | 25.8 | 25.1 | 24.2 | 22.7 | 19.5 | 14.6 | 17.4 | 20.4 | 25.6 | 19.2 | 21.9 |
| | Water absorption (%) | 4.2 | 4.0 | 3.8 | 3.6 | 3.2 | 2.8 | 2.4 | 4.9 | 4.5 | 3.9 | 2.8 | 3.2 | 3.2 |
| | % Retention of flexural modulus after water absorption (%) | 40 | 43 | 48 | 53 | 57 | 65 | 69 | 50 | 56 | 56 | 55 | 53 | 57 |
| | % Retention of flexural strength after water absorption (%) | 44 | 42 | 47 | 50 | 55 | 60 | 64 | 51 | 54 | 57 | 56 | 53 | 57 |
| | Change in dimension in flow direction at water absorption (%) | 0.09 | 0.09 | 0.08 | 0.07 | 0.07 | 0.05 | 0.05 | 0.37 | 0.25 | 0.08 | 0.05 | 0.06 | 0.07 |
| | Change in dimension rectangular to flow direction at water to flow direction at water absorption (%) | 0.84 | 0.71 | 0.61 | 0.59 | 0.57 | 0.55 | 0.42 | 0.64 | 0.55 | 0.61 | 0.50 | 0.59 | 0.60 |
| | Stress cracking resistance | C | C | B | A | A | B | C | C | B | A | A | A | A |

Note:
*(1)Proportion to 100 parts of PP resin on modification.
*(2)Proportion to 100 parts of PA resin and PP resin in total.

From the above results, it is seen that when the amount of PP resin is too small, the % retention of flexural modulus after water absorption is low and the resistance to stress cracking is poor as shown in Sample Nos. 18 and 19. Within the range of the proportion of PA resin and PP resin being from 95:5 to 70:30, a higher amount of PP resin gives a higher % retention of flexural modulus after water absorption and a smaller size change (Sample Nos. 20 to 23). In Sample No. 23, the heat deformation temperature is low but the composition is still usable depending on the purpose. In Sample No. 24, the heat deformation temperature is too low, and the composition is not practically usable for a vessel which is required to be resistant to heat. Further, in Sample Nos. 24 and 25, resistance to stress cracking is poor. As clear in Sample Nos. 27 and 28, the composition has relatively good thermal properties and elasticity when the amount of glass fibers is from 60 to 150 parts to 100 parts of the total amount of PA resin and PP resin. However, the incorporation with glass fibers in such a large amount as exceeding 200 parts can not produce any enhancement of the strength and rather deteriorates the molding property and produces breaking of strands on compounding, although this is not shown in the said Table. Sample Nos. 29 and 30 show the compositions using unmodified PP resin and modified PP resin wherein the cutting of the molecular chains proceeded to a considerable extent during the modification, respectively. In Sample No. 29, the flexural strength is inferior and the surface characteristics are poor. Sample No. 20 using modified PP resin wherein the modification was carried out with less than 0.01 part of an organic peroxide to 100 parts of PP resin was better in flexural strength and showed about 30% higher in the izod impact strength (notched) than Sample No. 30 using modified PP resin wherein the modification was carried out with a relatively large amount of the organic peroxide.

As understood from the above Examples, the molded product of the polymer blend composition according to this invention is excellent in heat resistance, chemical resistance, water resistance, surface characteristics, etc. and therefore suitable for manufacture of vessels, containers and other articles, for which the said properties are required.

Using the polymer blend composition of the invention, the upper tank and the lower tank (including a fitting screw and a pipe connecting screw at the liquid outlet) for a radiator tank were injection molded at a cylinder temperature of 260° to 270° C. and a mold temperature of 90° C. As the result, excellent molding property was observed. The molded products are characteristic in having no material warp. With the molded products and a radiator core, a radiator tank was constructed, and the constructed tank was subjected to use test. An excellent endurance over a long period of time without production of any stress cracking was observed.

What is claimed is:

1. A fiber-reinforced polymer blend composition comprising (a) a polyamide resin, (b) a modified polypropylene resin having a melt flow index of 1 to 50 g/10 minutes and at least one carboxyl group in the molecule and (c) a fiber-reinforcing agent, the weight ratio of the polyamide resin (a) and the polypropylene resin (b) being from 70:30 to 95:5 and a content of the fiber-reinforcing agent (c) being from 50 to 200% by weight on the basis of the total amount of the polyamide resin (a) and the polypropylene resin (b).

2. The composition according to claim 1, wherein the polypropylene resin (b) has a melt flow index of 1 to 20 g/10 minutes.

3. The composition according to claim 1, wherein the polypropylene resin (b) is a copolymer of propylene and an ethylenically unsaturated carboxylic acid or its derivative in a weight proportion of 100:0.02-5.

4. The composition according to claim 1, wherein the polypropylene resin (b) is a graft copolymer of polypropylene grafted with an ethylenically unsaturated carboxylic acid or its derivative in an amount of 0.02 to 5 parts by weight based on 100 parts by weight of polypropylene.

5. The composition according to claim 4, wherein the amount of the ethylenically unsaturated carboxylic acid or its derivative is from 0.1 to 0.5 part by weight based on 100 parts by weight of polypropylene.

6. The composition according to claim 1, wherein the polypropylene resin (b) is a polymer prepared by meltkneading polypropylene and an ethylenically unsaturated carboxylic acid or its derivative in a weight proportion of 100:0.02-5 in the presence of not more than 0.03 part by weight of an organic peroxide to 100 parts by weight of polypropylene.

7. The composition according to claim 3, wherein the ethylenically unsaturated carboxylic acid or its derivative is maleic anhydride.

8. The composition according to claim 1, wherein the polyamide resin (a) comprises polycapraamide as the major component.

9. The composition according to claim 1, wherein the fiber-reinforcing agent is glass fibers.

10. The composition according to claim 1, wherein the weight ratio of the polyamide resin (a) to the polypropylene resin (b) is from 75:25 to 95:5.

11. A molded product prepared by injection-molding the fiber-reinforced polymer blend composition according to claim 1.

12. The molded product according to claim 11, which is a container.

* * * * *